United States Patent
Wu et al.

(10) Patent No.: US 9,174,421 B2
(45) Date of Patent: Nov. 3, 2015

(54) TRANSFER ASSIST MEMBERS

(71) Applicant: XEROX CORPORATION, Norwalk, CT (US)

(72) Inventors: Jin Wu, Pittsford, NY (US); Kyle B. Tallman, Perry, NY (US); Qi Ying Li, Niagara Falls, CA (US); Alexander N. Klymachyov, Webster, NY (US); Jonathan H. Herko, Walworth, NY (US)

(73) Assignee: XEROX CORPORATION, Norwalk, CT (US)

( * ) Notice: Subject to any disclaimer, the term of this patent is extended or adjusted under 35 U.S.C. 154(b) by 85 days.

(21) Appl. No.: 14/055,821

(22) Filed: Oct. 16, 2013

(65) Prior Publication Data

US 2015/0104226 A1 Apr. 16, 2015

(51) Int. Cl.
| | |
|---|---|
| *G03G 15/16* | (2006.01) |
| *G03G 13/16* | (2006.01) |
| *B32B 27/40* | (2006.01) |
| *B32B 27/28* | (2006.01) |
| *B32B 27/08* | (2006.01) |
| *B32B 7/00* | (2006.01) |
| *B32B 7/12* | (2006.01) |
| *B32B 27/06* | (2006.01) |
| *B32B 27/18* | (2006.01) |
| *B32B 27/20* | (2006.01) |
| *B32B 27/30* | (2006.01) |
| *B32B 27/32* | (2006.01) |
| *B32B 27/34* | (2006.01) |
| *B32B 27/36* | (2006.01) |
| *B32B 1/00* | (2006.01) |

(52) U.S. Cl.
CPC . *B32B 27/28* (2013.01); *B32B 1/00* (2013.01); *B32B 7/00* (2013.01); *B32B 7/12* (2013.01); *B32B 27/06* (2013.01); *B32B 27/08* (2013.01); *B32B 27/18* (2013.01); *B32B 27/20* (2013.01); *B32B 27/281* (2013.01); *B32B 27/286* (2013.01); *B32B 27/288* (2013.01); *B32B 27/30* (2013.01); *B32B 27/32* (2013.01); *B32B 27/34* (2013.01); *B32B 27/36* (2013.01); *G03G 15/1685* (2013.01); *B32B 2250/00* (2013.01); *B32B 2255/10* (2013.01); *B32B 2255/26* (2013.01); *B32B 2307/202* (2013.01); *B32B 2307/4023* (2013.01)

(58) Field of Classification Search
CPC ........ G03G 15/16; G03G 13/16; B32B 27/08; B32B 27/28
USPC ......................... 428/423.1; 399/308
See application file for complete search history.

(56) References Cited

U.S. PATENT DOCUMENTS

| | | | | |
|---|---|---|---|---|
| 5,376,434 | A * | 12/1994 | Ogawa et al. ............... | 428/195.1 |
| 5,447,751 | A * | 9/1995 | Horinka et al. ............... | 427/257 |
| 6,483,034 | B1 * | 11/2002 | Sasagawa et al. ........... | 174/84 R |
| 6,606,478 | B2 * | 8/2003 | Fayette et al. ................ | 399/316 |
| 2010/0297356 | A1 * | 11/2010 | Flood et al. ................ | 427/388.1 |
| 2015/0050054 | A1 * | 2/2015 | Wu et al. ..................... | 399/316 |
| 2015/0050055 | A1 * | 2/2015 | Wu et al. ..................... | 399/316 |

* cited by examiner

*Primary Examiner* — Thao T Tran
(74) *Attorney, Agent, or Firm* — Pillsbury Winthrop Shaw Pittman LLP (57) ABSTRACT

A transfer assist member comprising a plurality of layers, one of the layers being a check film layer comprised of a crosslinked mixture of urea-glyoxal resins, and polyester polyols present on a support polymer layer.

19 Claims, 4 Drawing Sheets

TRANSFER ASSIST MEMBERS

This disclosure is generally directed to transfer assist members comprised of a plurality of layers, one of which layers is a check film layer comprised of crosslinked urea-glyoxal resins and polyester polyols on a polymer layer.

BACKGROUND

In the process of xerography, a light image of an original to be copied is typically recorded in the form of a latent electrostatic image upon a photosensitive or a photoconductive member with subsequent rendering of the latent image visible by the application of particulate material, commonly referred to as toner. The visual toner image can be either fixed directly upon the photosensitive member or the photoconductor member, or transferred from the member to another support, such as a sheet of plain paper, with subsequent affixing by, for example, the application of heat and pressure of the image thereto.

To affix or fuse toner material onto a support member like paper, by heat and pressure, it is usually necessary to elevate the temperature of the toner and simultaneously apply pressure sufficient to cause the constituents of the toner to become tacky and coalesce. In both the xerographic as well as the electrographic recording arts, the use of thermal energy for fixing toner images onto a support member is known.

One approach to the heat and pressure fusing of toner images onto a support has been to pass the support with the toner images thereon between a pair of pressure engaged roller members, at least one of which is internally heated. For example, the support may pass between a fuser roller and a pressure roller. During operation of a fusing system of this type, the support member to which the toner images are electrostatically adhered is moved through the nip formed between the rollers with the toner image contacting the fuser roll thereby to effect heating of the toner images within the nip.

The process of transferring charged toner particles from an image bearing member marking device, such as a photoconductor, to an image support substrate like a sheet of paper involves overcoming cohesive forces holding the toner particles to the image bearing member. The interface between the photoconductor surface and image support substrate may not in many instances be optimal, thus, problems may be caused in the transfer process when spaces or gaps exist between the developed image and the image support substrate. One aspect of the transfer process is focused on the application and maintenance of high intensity electrostatic fields in the transfer region for overcoming the cohesive forces acting on the toner particles as they rest on the photoconductive member. Control of these electrostatic fields and other forces is a factor to induce the physical detachment and transfer of the charged toner particles without scattering or smearing the developer material.

More specifically, the process of transferring charged toner particles from an image bearing member, such as a photoconductive member, to an image support substrate, such as the copy sheet, may be accomplished by overcoming adhesive forces holding the toner particles to the image bearing member. In general, transfer of developed toner images in electrostatographic applications has been accomplished via electrostatic induction using a corona generating device, wherein the image support substrate is placed in direct contact with the developed toner image on the photoconductive surface while the reverse side of the image support substrate is exposed to a corona discharge. This corona discharge generates ions having a polarity opposite that of the toner particles, thereby electrostatically attracting and transferring the toner particles from the photoreceptive member to the image support substrate.

In the electrostatic transfer of the toner powder image to the copy sheet, it is necessary for the copy sheet to be in uniform intimate contact with the toner powder image developed on the photoconductive surface. Unfortunately, the interface between the photoreceptive surface and the copy substrate is not always optimal. In particular, non-flat or uneven image support substrates, such as copy sheets that have been mishandled, left exposed to the environment or previously passed through a fixing operation, such as heat and/or pressure fusing, tend to promulgate imperfect contact with the photoreceptive surface of the photoconductor. Further, in the event the copy sheet is wrinkled, the sheet will not be in intimate contact with the photoconductive surface and spaces or air gaps will materialize between the developed image on the photoconductive surface and the copy sheet. Problems may occur in the transfer process when spaces or gaps exist between the developed image and the copy substrate. There is a tendency for toner not to transfer across these gaps causing variable transfer efficiency and, in the extreme, can create areas of low or no transfer resulting in a phenomenon known as image transfer deletion. Clearly, an image deletion is very undesirable in that useful information and indicia are not reproduced on the copy sheet.

As described herein, the typical process of transferring development materials in an electrostatographic system involves the physical detachment and transfer over of charged toner particles from an image bearing photoreceptive surface into attachment with an image support substrate via electrostatic force fields. Thus, an aspect of the transfer process is focused on the application and maintenance of high intensity electrostatic fields in the transfer region for overcoming the adhesive forces acting on the toner particles as they rest on the photoreceptive member. In addition, other forces, such as mechanical pressure or vibratory energy, have been used to support and enhance the transfer process. Careful control of these electrostatic fields and other forces can be required to induce the physical detachment and transfer over of the charged toner particles without scattering or smearing of the developer material.

With the advent of multicolor electrophotography, it is desirable to use an architecture which comprises a plurality of image forming stations. One example of the plural image forming station architecture utilizes an image-on-image (IOI) system in which the photoreceptive member is recharged, reimaged and developed for each color separation. This charging, imaging, developing and recharging, reimaging and developing, all followed by transfer to paper, can be completed in a single revolution of the photoreceptor in so-called single pass machines, while multipass architectures form each color separation with a single charge, image and develop, with separate transfer operations for each color.

Alternatively, mechanical devices, such as rollers, have been used to force the image support substrate into intimate and substantially uniform contact with the image bearing surface. For example, there can be selected an electrically biased transfer roll system in an attempt to minimize image deletions. In other electrophotographic printing machines, such as the color producing Xerox Corporation 1065 machine, the copy sheet is provided with a precisely controlled curvature as it enters the transfer station for providing enhanced contact pressure.

However, the interface between the image bearing surface and the print sheet is rarely uniform. Print sheets that have been mishandled, left exposed to the environment, or previously passed through a fixing operation, such as heat and/or pressure fusing, tend to be non-flat or uneven. An uneven print sheet makes uneven contact with the image bearing surface. In the event that the print sheet is wrinkled, the sheet will not be in continuous intimate contact with the image bearing surface. Wrinkles in the sheet cause spaces or air gaps to materialize between the developed toner powder image on the image bearing surface and the print sheet. When spaces or gaps exist between the developed image and the print sheet, various problems may result. For example, there is a tendency for toner not to transfer across the gaps, causing variable transfer efficiency and creating areas of low toner transfer, or even no transfer; a phenomenon known as image transfer deletion.

Image transfer deletion is undesirable in that portions of the desired image may not be appropriately reproduced on the print sheet. The area of the blade that contacts the photoreceptor will, in most instances, pick up residual dirt and toner from the photoreceptor surface. The next job run, which processes print sheets, having a dimension greater than 10 inches will have the residual dirt on the transfer assist blade transferred to the back side of the print sheet, resulting in an unacceptable print quality defect. More importantly, continuous frictional contact between the blade and the photoreceptor may cause permanent damage to the photoreceptor.

In single pass color machines it is desirable to cause as little disturbance to the photoreceptor as possible so that motion errors are not propagated along the belt to cause image quality and color separation registration problems. One area that has potential to cause such a disturbance is when a sheet is released from the guide after having been brought into contact with the photoreceptor for transfer of the developed image thereto. This disturbance, which is often referred to as trail edge flip, can cause image defects on the sheet due to the motion of the sheet during transfer caused by energy released due to the bending forces of the sheet. Particularly in machines which handle a large range of paper weights and sizes, it is difficult to have a sheet guide which can properly position any weight and size sheet while not causing the sheet to oscillate after having come in contact with the photoreceptor.

There is a need for transfer assist members that substantially avoid or minimize the disadvantages illustrated herein.

Also, there is a need for transfer assist members that are wear resistant and that can be used for extended time periods without being replaced.

There is also a need for toner developed images transfer assist members that permit the continuous contact between a photoconductor and the substrate to which the developed toner image is to be transferred, and an apparatus for enhancing contact between a copy sheet and a developed image positioned on a photoconductive member.

Yet another need resides in providing xerographic printing systems, inclusive of multi-color generating systems, where there is selected a transfer assist member that maintains sufficient constant pressure on the substrate to which a developed image is to be transferred, and to substantially eliminate air gaps between the sheet and the photoconductor in that the presence of air gaps can cause air breakdown in the transfer field.

Further, there is a need for transfer assist members that enable suitable and full contact of the developed toner image present on a photoconductor and a substrate to which the developed image is to be transferred.

Additionally, there is a need for transfer assist members that contain durable compositions that can be economically and efficiently manufactured, and where the amount of energy consumed is reduced.

Yet additionally, there is a need for a multilayered transfer assist member that includes as one layer a check film on the side exposed to a dicorotron/corona, and which member possesses excellent resistance characteristics.

Also, there is a need for transfer assist members where the check film layer can be generated roll to roll by economical extrusion processing.

Further, there is a need for transfer assist members with a combination of excellent durability that exert sufficient constant pressure on a substrate and permit the substrate to fully contact the toner developed image on a photoconductor, which members are to provide mechanical pressure about 20 percent of its function and electrostatic pressure/tailoring about 80 percent of its function, and where complete transfer to a sheet of a developed image contained a photoconductor results, such as for example, about 90 to about 100 percent, from about 90 to about 98 percent, from about 95 to about 99 percent, and in embodiments about 100 percent of the toner image is transferred to the sheet or a substrate, and wherein blurred final images are minimized or avoided, Moreover, there is a need for composite transfer assist blades that overcome or minimize the problems associated with a single component blade, as a single component blade in order to be flexible enough to prevent image damage does not provide enough contact force to the back of the sheet to enable complete image transfer giving rise to transfer deletions and color shift.

Yet, there is another need for transfer assist members that include check films, and which members are useful in electrophotographic imaging apparatuses, including digital printing where the latent image is produced by a modulated laser beam, or ionographic printing where charge is deposited on a charge retentive surface in response to electronically generated or stored images.

Lastly, there is a need for transfer assist member that include check films comprising ingredients that are safe to handle.

These and other needs are achievable in embodiments with the transfer assist members and components thereof disclosed herein.

SUMMARY

Disclosed is a transfer assist member comprising a transfer assist member comprising a plurality of layers, one of the layers being a check film layer comprising: a polymer support layer; and a crosslinked mixture of urea-glyoxal resins and polyester polyol resins disposed on the polymer support layer.

Also disclosed is a composite toner transfer assist blade comprising a composite toner transfer assist blade comprising a plurality of bonded layers, one of the bonded layers being a bonded check film layer comprising: a polymer layer substrate comprising a polyalkylene terephthalate, a polyester, or mixtures thereof; and a partially conductive crosslinked mixture of urea-glyoxal resins and polyester polyols layer disposed on the polymer layer substrate, wherein the top layer of the plurality of layers is a wear resistant layer and further wherein the bonded check film includes conductive components, acid catalysts, silicas, plasticizers, fluoropolymer particles of tetrafluoroethylene polymers, trifluorochloroethylene polymers, hexafluoropropylene polymers, vinyl fluoride polymers, vinylidene fluoride polymers, difluorodichloroethylene polymers polysiloxane polymers, and mixtures thereof.

Further disclosed is a xerographic process for providing a xerographic process for providing substantially uniform contact between a copy substrate and a toner developed image located on an imaging member, comprising: moving a toner transfer flexible assist member from a non-operative position spaced from the imaging member to an operative position in contact with the copy substrate on the imaging member; and applying pressure against the copy substrate in a direction toward the imaging member with the toner transfer flexible assist member, wherein the toner transfer flexible assist member comprises a plurality of layers, one of the layers being a check film layer further comprising a polymer support layer, and a crosslinked mixture of urea-glyoxal resins and polyester polyol resins disposed on the polymer support layer.

BRIEF DESCRIPTION OF FIGURES

The following Figures are provided to further illustrate the transfer assist members and check films disclosed herein, and where the arrows when present illustrate the direction of movement of the various components shown.

DETAILED DESCRIPTION

The disclosed transfer assist members comprise a layer of, for example, a mixture of urea-glyoxal resins and polyester polyols, and the resulting crosslinked thermoset resins generated by the curing of the mixtures inclusive of partially conductive crosslinked urea-glyoxal resins/polyester polyols, and more specifically, a partially conductive thermoset resin generated by the reaction and crosslinking of urea-glyoxal resins and polyester polyols contained on a polymer substrate, and where the members apply pressure against a copy substrate, such as a sheet of paper, to create uniform contact between the copy substrate and a developed image formed on an imaging member, such as a photoconductor. The transfer assist member, such as for example, a blade presses the copy sheet into contact with at least the developed image on the photoconductive surface to substantially eliminate any spaces or gaps between the copy sheet and the developed image during transfer of the developed image from the photoconductive surface to the copy substrate.

Figure 1:
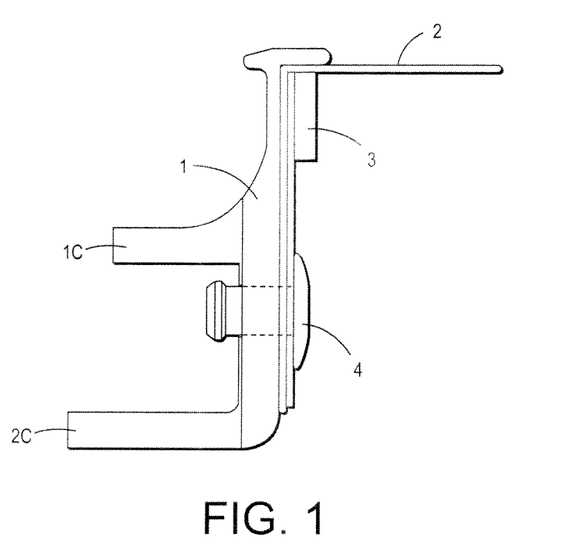
FIG. 1 and FIG. 1A illustrate exemplary side views of the transfer assist member of the present disclosure.

FIG. 1 illustrates a side view of the transfer assist member assembly of the present disclosure. More specifically, illustrated in FIG. 1 is an aluminum component 1 to secure the member, such as a blade (illustrated herein by the transfer assist member petal assembly 2), and which component 1, generated for example by extrusion processes, is attached to the transfer assist member petal assembly 2, and where the petal assembly 2 is comprised of the nine-layer blade member as shown in FIG. 3, and where the numeral or designation 3 (shown in FIGS. 1, 1A and 2), represents a stainless steel clamp, and the designation 4 (shown in FIGS. 1, 1A and 2), represents an aluminum rivet, whereby the clamp 3 and rivet 4 retain in position the petal assembly 2, between clamp 3 and aluminum component 1, and where 1C and 2C represent spaced-apart integral arms of component 1.

Figure 1A:
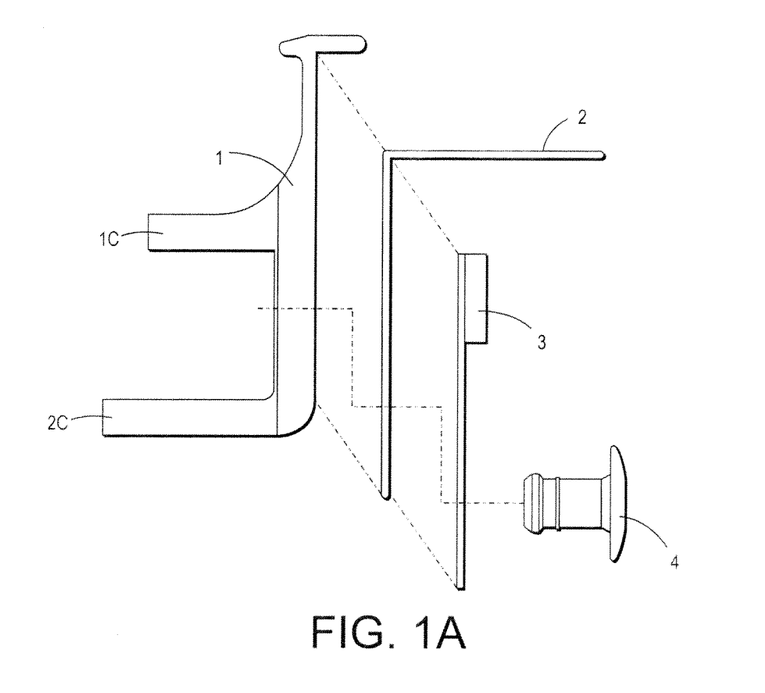

The corresponding FIG. 1A illustrates the disassembled components or form of the transfer assist members of the present disclosure where the designations 1, 2, 3, 4, 10 and 2C for this FIG. 1A are the same as those designations as shown in FIG. 1.

Figure 2:
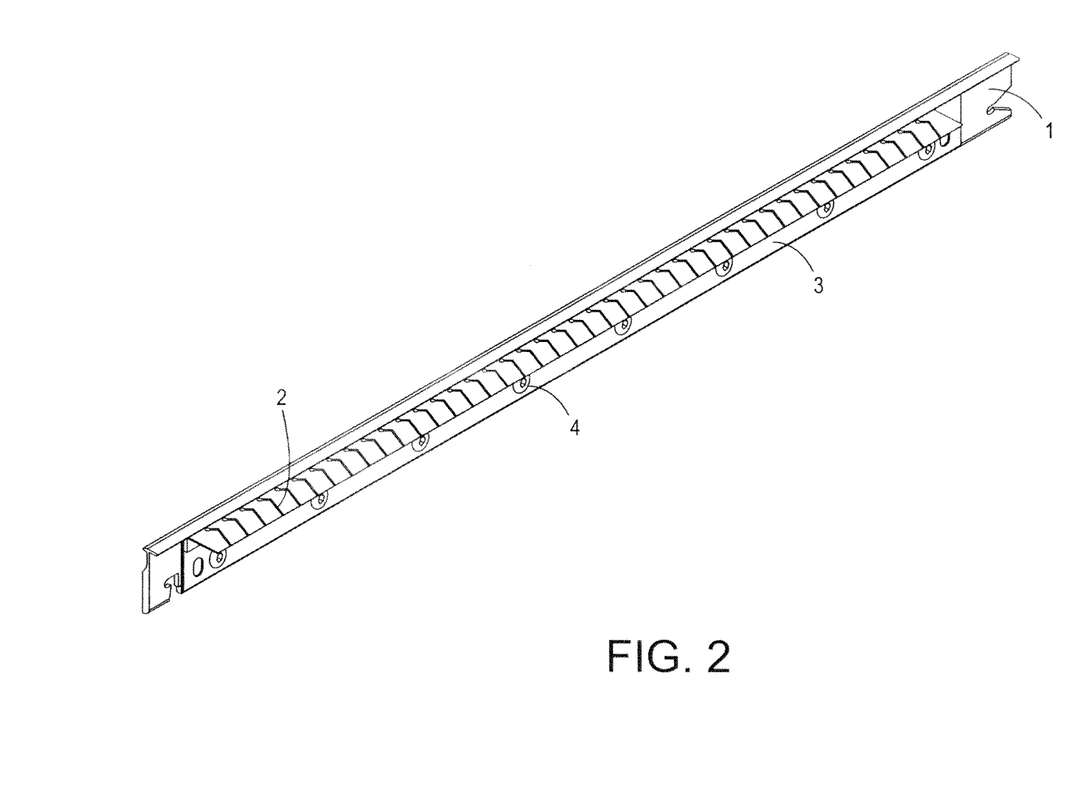
FIG. 2 illustrates an exemplary view of the transfer assist member assembly of the present disclosure.
Figure 3:
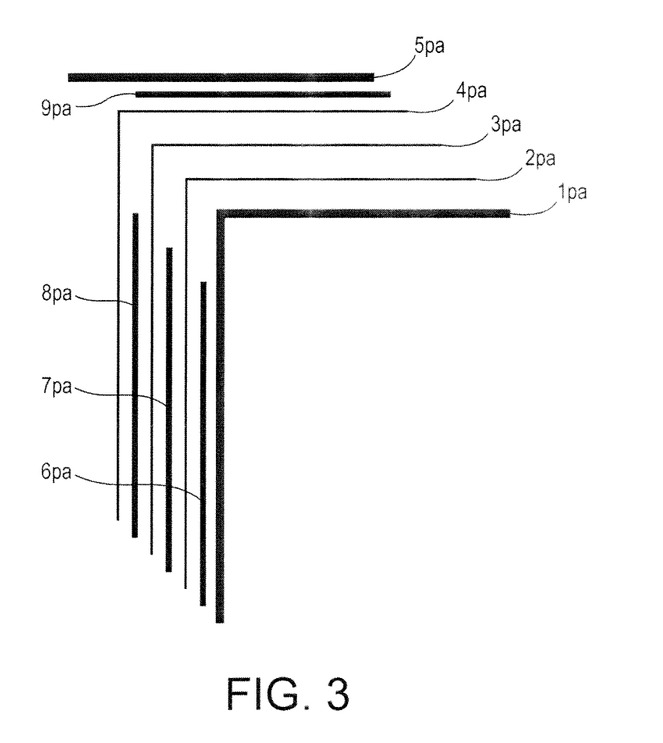
FIG. 3 illustrates an exemplary view of the transfer assist member petal of the present disclosure.

FIG. 2 illustrates another view of the transfer assist member assembly of the present disclosure, and where the designations 1, 2, 3, 4, for this Figure are the same as the designations as presented in FIG. 1, that is aluminum component 1 to secure the member, such as a blade, and which component is generated, for example, by extrusion processes, attached to the transfer assist member petal assembly 2, and where the petal assembly 2 comprises the five-layer blade member as shown in FIG. 3, and where numeral or designation 3 represents a stainless steel clamp, and designation 4 represents an aluminum rivet, and which clamp and rivet retain in position the petal assembly 2 between designations 3 and 1.

FIG. 3 illustrates the components and compositions of the transfer assist member petal assembly of the present disclosure. More specifically, shown in FIG. 3 is an embodiment of the transfer assist member petal assembly 2 of the present disclosure. Specifically, the transfer assist member petal assembly 2 (shown in FIGS. 1, 1A and 2) comprises the check film layer 1pa, which itself comprises a thermoplastic overcoat layer present on a polymer substrate, and as an example of such may thus include polymer layers 2pa, 3pa, and 4pa. The transfer assist member petal assembly 2 further includes a top overcoat wear resistant layer 5pa, and may also include optional adhesive layers 6pa, 7pa, 8pa and 9pa between the respective pairs of layers 1pa and 2pa, 2pa and 3pa, 3pa and 4pa, 4pa and 5pa, as shown in FIG. 3.

Figure 4:
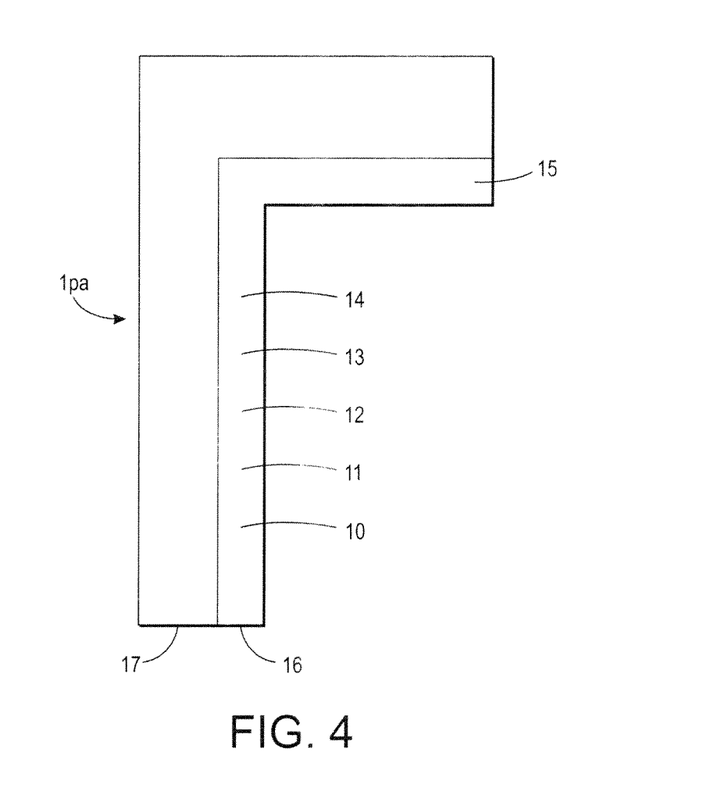
FIG. 4 illustrates an exemplary view of the check film or partially conductive film of the present disclosure.

FIG. 4 illustrates the components and compositions of the transfer assist member check films of the present disclosure. More specifically, shown in FIG. 4 is an embodiment of the check film 1pa comprised of supporting substrate layer 17, a layer 16 comprised of a partially conductive thermoset resin 10 generated by the reaction and crosslinking of urea-glyoxal resins and polyester polyols; and further comprised of optional conductive components or fillers 11, optional silicas 12, optional fluoropolymer particles 13, optional catalysts 14, and optional leveling agents 15.

Transfer Assist Member

Various mixtures of urea-glyoxal resins 10A and polyester polyol resins 10B can be selected for the disclosed transfer assist members, such as check film layer of FIG. 4, designation 16, of the disclosed transfer assist members. Urea-glyoxal resins are formaldehyde-free, which is desirable as formaldehyde has been classified by the Environmental Protection Agency (EPA) as a known human carcinogen. Urea-glyoxal resins do not emit formaldehyde during the curing process, and possess excellent compatibility with a variety of —OH functional resins such as polyester polyols, alkyd polyols or acrylic polyols.

The cured crosslinked mixture products thereof are in embodiments partially conductive having a resistance intermediate between insulators and conductors, such as for example, a resistance of from about $1 \times 10$ to about $9.99 \times 10^{10}$ ohm, from about $1 \times 10^8$ to about $9.99 \times 10^8$ ohm, from about $1 \times 10^7$ to about $9.99 \times 10^8$ ohm, from about $1 \times 10^7$ to about $9.99 \times 10^9$, and from about $1 \times 10^8$ ohm to about $9.99 \times 10^9$ ohm can be selected for the transfer assist members disclosed herein, and which resistance can be determined or measured by a Resistance Meter. The disclosed glass transition temperatures can be determined by a number of known methods, and more specifically, such as by Differential Scanning calorimetry (DSC). For the disclosed molecular weights, such as $M_w$ (weight average) and $M_n$ (number average), can be determined by a number of known methods, and more specifically by Gel Permeation Chromatography (GPC).

Urea-Glyoxal Resin Examples

Urea-glyoxal resins are prepared comprising the steps of providing a mixture AC of an aliphatic alcohol A having at least one hydroxyl group and from about 1 to about 10 carbon atoms, with at least one multifunctional aldehyde C having at least two aldehyde groups —CHO such as glyoxal, and reacting the said mixture AC to convert at least a part of the multifunctional aldehyde C to its hemiacetal or to its acetal to form a mixture (AC)', adding to the mixture (AC)' least one cyclic urea U or the educts (starting products for the synthesis) to produce the said cyclic urea U in situ, which cyclic urea U has at least one unsubstituted amidic —NH— group, and reacting the mixture thus obtained to form a chemical bond between the nitrogen atom of the at least one unsubstituted amidic —NH— group of the at least one cyclic urea U, and the carbon atom of the least one aldehyde group —CHO of the multifunctional aldehyde C, or of the carbon atom of the at least one aldehyde group —CHO of the of the multifunctional aldehyde C which said aldehyde group is converted to a hemiacetal group or acetal group by reaction with the alcohol A. It goes without saying that even by reacting the aldehyde C to its hemiacetal or to its acetal, the carbon atom of the aldehyde group remains the same, therefore it is equivalent to say "the carbon atom of the least one aldehyde group —CHO of the multifunctional aldehyde C", and "the carbon atom of the at least one aldehyde group —CHO of the multifunctional aldehyde C which said aldehyde group is converted to a hemiacetal group or acetal group by reaction with the alcohol A".

The aliphatic alcohols A useful for the urea-glyoxal resins have at least one hydroxyl group, and from about 1 to about 10 carbon atoms. They can be linear, branched or cyclic, preferably linear or branched, and preferably have from about 1 to about 8 carbon atoms, such as methanol, ethanol, n- and iso-propanol, and the isomeric butanols, particularly n-butanol, and iso-butanol, n-hexanol, or 2-ethylhexanol. Polyhydric alcohols which may be used, alone or in mixture with monohydric alcohols, include ethylene glycol, 1,2- and 1,3-propane diol, 1,2- and 1,4-butane diol, 1,2- and 1,6-hexane diol, glycerol, trimethylol ethane and trimethylol propane, pentaerythritol, diglycerol, ditrimethylol ethane and ditrimethylol propane, mannitol and sorbitol. It is also possible to employ mixtures of the monohydric alcohols, such as a mixture of methanol and iso-butanol, or mixtures of the said polyhydric alcohols with each other or mixtures thereof with monohydric alcohols.

The multifunctional aldehydes C have at least two aldehyde groups, and are preferably aliphatic in nature. Preferred aldehydes are glyoxal, succinic dialdehyde, and glutardialdehyde. It is also possible to use mixtures of these.

The cyclic ureas U which may be used have at least one unsubstituted amidic —NH— group. These cyclic ureas U are cycloaliphatic or bicycloaliphatic compounds having an element of the structure —NH—CO—NH— within a ring structure, the total number of ring atoms preferably being from about 5 to about 7 (ethylene urea, 1,3-propylene urea, 1,4-butylene urea or tetramethylene urea). In the case of a bicyclic compound, the simplest structure is glycoluril or acetylene diurea. These cyclic ureas may be substituted, preferably by alkyl groups on the N— or C— atoms, or both, or by hydroxy or alkoxy groups on the C— atoms of the ring, the alkyl or alkoxy residues in both cases preferably having from one to four carbon atoms. At least one of the nitrogen atoms must remain unsubstituted to enable reaction with the aldehyde or (hemi)acetal functional molecule. Preferred cyclic ureas may also carry hydroxyl groups as substituents on one or more of the carbon atoms, 4,5-dihydroxyethylene urea being particularly preferred. It is also preferred to use mixtures of two or more of the mentioned cyclic ureas, with particular preference of mixtures of ethylene urea and dihydroxyethylene urea. Adducts of these latter mixtures of these with glyoxal which are at least partially etherified have shown particularly good reactivity at ambient temperature. Such mixtures can be prepared by reacting mixtures of the cyclic ureas with glyoxal, or by reacting the cyclic ureas individually with glyoxal, and then mixing the reaction products. The cyclic ureas used may also be formed in situ by reaction of urea itself, or di- or poly-ureas, which may optionally be substituted, having one, two or more than two groups of the structure —NH—CO—NH— in their molecules with multifunctional aldehydes which have more than one aldehyde group in their molecule, preferably with dialdehydes, particularly preferably with glyoxal. As further examples, the reaction product of acetaldehyde with urea, crotonylidene urea, or the reaction product of urea and isobutyric aldehyde, isobutylidene diurea, may be reacted by addition of one molecule of glyoxal thereto. Preferably, the at least one cyclic urea U is selected from the group U1 consisting of ethylene urea, 4-hydroxyethylene urea, 4,5-dihydroxy ethylene urea, and glycoluril, and from the group U2 consisting of the ureas U1 which additionally have at least one substituent R on at least one of the nitrogen or carbon atoms of the said ureas U1, with the proviso that at least one nitrogen atom is unsubstituted, and the substituent R is selected from the group consisting of linear, branched and cyclic alkyl groups having from about 1 to about 10 carbon atoms.

Preferred examples of urea-glyoxal resins are ethyleneurea-glyoxal resins including butylated ethyleneurea-glyoxal resins, such as CYMEL® NF3041 (available from Allnex Belgium SA/NV, Brussels, Belgium). Such resins are prepared from the following scheme:

Other examples of the ethyleneurea-glyoxal resins include butylated ethyleneurea-glyoxal resin, ethylated ethyleneurea-glyoxal resins, ethylated 4,5-dihydroxyethyleneurea-glyoxal resins and the like and mixtures thereof.

Polyester Polyols

Polyester polyols are known and can be generated by the polycondensation of a diacid with a diol or a polyol. The diol or polyol is usually in excess in mole ratio to the diacid. The polyester polyol can be linear or branched, saturated or unsaturated, and aliphatic or aromatic.

Diol means a chemical compound containing two hydroxyl groups. Examples of diols that can be used in the condensation polymerization include ethylene glycol, diethylene glycol, triethylene glycol, butylene glycol, propylene glycol, dipropylene glycol, neopentyl glycol, 1,5-pentanediol, 1,8-octanediol, 1,2-propanediol, 1,3-butanediol, 1,2-pentanediol, 2-methyl-2,4-pentanediol, bisphenol A, Z, C, S and the like, and mixtures thereof.

Polyol means a chemical compound containing multiple hydroxyl groups. Examples of polyols that can be used in the condensation polymerization include trimethylol propane, glycerin, pentaerythritol, sugar alcohols, such as sucrose, maltitol, sorbitol, xylitol, erythritol, isomalt, and the like, and mixtures thereof.

Examples of diacids that can be used in the condensation polymerization include saturated dicarboxylic acids such as adipic acid, succinic acid, oxalic acid, malonic acid, glutaric acid, pimelic acid, suberic acid, azelaic acid, sebacic acid, undecanedioic acid and dodecanedioic acid; unsaturated dicarboxylic acids such as maleic acid, fumaric acid, glutaconic acid, traumatic acid and muconic acid; aromatic dicarboxylic acids such as phthalic acid, isophthalic acid and terephthalic acid, mixtures thereof, and the like.

Polyester polyols that may be selected for the disclosed transfer assist members possess, for example, a hydroxyl functionality of from about 2 to about 6, from about 2 to about 4, or from about 2 to about 3; a hydroxyl number of from about 20 to about 400 mg KOH/g, from about 40 to about 350 mg KOH/g, or from about 50 to about 300 mg KOH/g; a number average molecular weight of from about 500 to about 50,000, or from about 1,000 to about 30,000, and a weight average molecular weight of from about 600 to about 200,000, or from about 1,500 to about 100,000 as determined by a number of known methods, and more specifically, by Gel Permeation Chromatography (GPC).

Examples of polyester polyols examples that can be selected for the disclosed transfer assist members include polyethylene adipate diol, polyethylene adipate-co-butylene adipate diol, polybutylene adipate diol, poly(2,2'-oxydiethylene adipate)diol, polyhexene adipate diol, polyethylene succinate diol, polyethylene succinate-co-butylene succinate diol, polybutylene succinate diol, poly(2,2'-oxydiethylene succinate)diol, polyhexene succinate diol, polyethylene phthalate diol, polyethylene phthalate-co-butylene phthalate diol, polybutylene phthalate diol, poly(2,2'-oxydiethylene phthalate)diol, polyhexene phthalate diol, poly(diethylene glycol-co-trimethylol propane)adipate polyol, poly(diethylene glycol-co-trimethylol propane)succinate polyol, or poly(diethylene glycol-co-trimethylol propane)phthalate polyol, and copolymers thereof, and mixtures thereof.

Commercially available polyester polyol examples that can be selected for the disclosed transfer assist members include AROPLAZ® 1720-Z-60 (hydroxyl number=50 mg KOH/g), 5725-Z-65 (hydroxyl number=30 mg KOH/g), 6025-Z-65 (hydroxyl number=40 mg KOH/g), 6126-Z-65 (hydroxyl number=40 mg KOH/g), 6820-K4-90 (hydroxyl number=140 mg KOH/g), 91-341 (hydroxyl number=30 mg KOH/g), 6755-A6-80, 4294 (hydroxyl number=288 mg KOH/g), 6420 (hydroxyl number=270 mg KOH/g), all available from Reichhold Inc., Research Triangle Park, NC; DESMOPHEN® 2000 (a polyethylene adipate diol, hydroxyl number=52-58 mg KOH/g, $M_n$=2,000), 2001 K (a polyethylene/polybutylene adipate dial, hydroxyl number=52 to 58 mg KOH/g, $M_n$=2,000), 2502 (a polybutylene adipate diol, hydroxyl number=54 to 58 mg KOH/g, $M_n$=2,000), 2505 (a polybutylene adipate diol, hydroxyl number=26 to 30 mg KOH/g, $M_n$=4,000), S-1011-45 (hydroxyl number=42 to 48 mg KOH/g), 1700, 1800, all available from Bayer MaterialScience LLC, Pittsburg, Pa.; DIOREZ™ 750, PR3, 756LH, 756, 755, 8018, 8045, 8040, 620/02, 8034, 8024, 770/07, 720/01, 7194, 7097, 7040, 687, 610, 810, PR1, 7988012, 770/02, 8035, 770/00, all available from The Dow Chemical company, Midland, Mich.; STEPANPOL® [a poly(2,2'-oxydiethylene phthalate)diol] PC-020-01 (hydroxyl number=20 mg KOH/g, $M_n$=5,600), PC-030-01 (hydroxyl number=30 mg KOH/g, $M_n$=3,740), PD-56 (hydroxyl number=56 mg KOH/g, $M_n$=2,000), PDP-70 (hydroxyl number=70 mg KOH/g, $M_n$=1,600), PN-110 (hydroxyl number=110 mg KOH/g, $M_n$=1,020), PC-125-01 (hydroxyl number=125 mg KOH/g, $M_n$=900), 130-01 (hydroxyl number=130 mg KOH/g, $M_n$=660), PC-160-01 (hydroxyl number=160 mg KOH/g, $M_n$=750), PC-165-01 (hydroxyl number=165 mg KOH/g, $M_n$=680), PS-1752 (hydroxyl number=175 mg KOH/g, $M_n$=640), PD-195 (hydroxyl number=200 mg KOH/g, $M_n$=600), AA-52 (hydroxyl number=52 mg KOH/g, $M_n$=2,800), AA-53 (hydroxyl number=52 mg KOH/g, $M_n$=2,200), AA-60 (hydroxyl number=60 mg KOH/g, $M_n$=2,800), AA-61 (hydroxyl number=60 mg KOH/g, $M_n$=2,755), AA-58 (hydroxyl number=61 mg KOH/g, $M_n$=2,525), PF-672 (hydroxyl number=67 mg KOH/g, $M_n$=1,675), PS-70L (hydroxyl number=70 mg KOH/g, $M_n$=1,600), PS-1552 (hydroxyl number=155 mg KOH/g, $M_n$=720), PS-1752 (hydroxyl number=175 mg KOH/g, $M_n$=640), AA-220 (hydroxyl number=225 mg KOH/g, $M_n$=500), all available from STEPAN Company; developmental polyester polyols from Myriant, Quincy, Mass. such as DGTA-56 (branched, functionality=2.4, hydroxyl number=61 mg KOH/g), DGTB-56 (branched, functionality=2.7, hydroxyl number=64 mg KOH/g), EG-110 (linear, functionality=2.0, hydroxyl number=107 mg KOH/g), DG-110 (linear, functionality=2.0, hydroxyl number=113 mg KOH/g), HD-110 (linear, functionality=2.0, hydroxyl number=108 mg KOH/g), APTA-56 (branched, functionality=2.4, hydroxyl number=76 mg KOH/g), APTB-56 (branched, functionality=2.7, hydroxyl number=60 mg KOH/g), APEG-110 (linear, functionality=2.0, hydroxyl number=90 mg KOH/g), APDG-110 (linear, functionality=2.0, hydroxyl number=116 mg KOH/g), APHD-110 (linear, functionality=2.0, hydroxyl number=95 mg KOH/g).

Subsequent to curing of the mixture of the urea-glyoxal and polyester polyol resins, there results a crosslinked product, and where the curing can be accomplished by heating at temperatures equal to or exceeding about 80° C. for extended time periods. More specifically the curing of the disclosed resin mixture can be accomplished at various suitable temperatures, such as for example, from about 80 to about 220° C., or from about 100 to about 180° C. for a period of from about 1 to about 120 minutes, or from about 3 to about 40 minutes. There results a crosslinked product of the urea-glyoxal resins and polyester polyol resins, and where the crosslinked value is from about 40 to about 100 percent, from about 50 to about 95 percent, from about 75 to about 100 percent, or from about 80 to about 98 percent, and which crosslinking percentage was determined by Fourier Transform Infrared Spectroscopy (FTIR).

The urea-glyoxal resins and polyester polyols are present in the disclosed transfer assist members in a number of differing effective amounts, such as for example, a total of 100 percent in those situations when no fillers and other optional components, such as plasticizers and silicas, are present from about 90 to about 99 weight percent, from about 80 to about 90 weight percent, from about 65 to about 75 weight percent, or from about 50 to about 60 weight percent providing the total percent of components present is about 100 percent, and wherein the weight percent is based on the total solids, such as the solids of the urea-glyoxal resins and polyester polyols, the conductive component or filler, the plasticizer when present, silica when present, acid catalyst when present, and the fluoropolymers when present.

The crosslinked containing mixture of the urea-glyoxal resins and polyester polyols overcoat film can be included in a number of thicknesses, such as from about 0.1 to about 50 microns, from about 1 to about 40 microns, or from about 5 to about 20 microns.

Optional Conductive Fillers

The crosslinked mixture of the urea-glyoxal resins and polyester polyols containing layer can further comprise optional conductive components such as known carbon forms, like carbon black, graphite, carbon nanotube, fullerene, graphene and the like; metal oxides, mixed metal oxides, conducting polymers such as polyaniline, polythiophene, polypyrrole, mixtures thereof, and the like.

Examples of carbon black conductive filler components that can be selected for incorporation into the urea-glyoxal resins and polyester polyols crosslinked mixture layer illustrated herein include Ketjenblack® carbon blacks available from AkzoNobel Functional Chemicals, special black 4 (B.E.T. surface area=180 $m^2$/g, DBP absorption=1.8 ml/g, primary particle diameter=25 nanometers) available from Evonik-Degussa, special black 5 (B.E.T. surface area=240 $m^2$/g, DBP absorption=1.41 ml/g, primary particle diameter=20 nanometers), color black FW1 (B.E.T. surface area=320 $m^2$/g, DBP absorption=2.89 ml/g, primary particle diameter=13 nanometers), color black FW2 (B.E.T. surface area=460 $m^2$/g, DBP absorption=4.82 ml/g, primary particle diameter=13 nanometers), color black FW200 (B.E.T. surface area=460 $m^2$/g, DBP absorption=4.6 ml/g, primary particle diameter=13 nanometers), all available from Evonik-Degussa; VULCAN® carbon blacks, REGAL® carbon blacks, MONARCH® carbon blacks, EMPEROR® carbon blacks, and BLACK PEARLS® carbon blacks available from Cabot Corporation. Specific examples of conductive carbon blacks are BLACK PEARLS® 1000 (B.E.T. surface area=343 $m^2$/g, DBP absorption=1.05 ml/g), BLACK PEARLS® 880 (B.E.T. surface area=240 $m^2$/g, DBP absorption=1.06 ml/g), BLACK PEARLS® 800 (B.E.T. surface area=230 $m^2$/g, DBP absorption=0.68 ml/g), BLACK PEARLS® L (B.E.T. surface area=138 $m^2$/g, DBP absorption=0.61 ml/g), BLACK PEARLS® 570 (B.E.T. surface area=110 $m^2$/g, DBP absorption=1.14 ml/g), BLACK PEARLS® 170 (B.E.T. surface area=35 $m^2$/g, DBP absorption=1.22 ml/g), EMPEROR® 1200, EMPEROR® 1600, VULCAN® XC72 (B.E.T. surface area=254 $m^2$/g, DBP absorption=1.76 ml/g), VULCAN® XC72R (fluffy form of VULCAN® XC72), VULCAN® XC605, VULCAN® XC305, REGAL® 660 (B.E.T. surface area=112 $m^2$/g, DBP absorption=0.59 ml/g), REGAL® 400 (B.E.T. surface area=96 $m^2$/g, DBP absorption=0.69 ml/g), REGAL® 330 (B.E.T. surface area=94 $m^2$/g, DBP absorption=0.71 ml/g), MONARCH® 880 (B.E.T. surface area=220 $m^2$/g, DBP absorption=1.05 ml/g, primary particle diameter=16 nanometers), and MONARCH® 1000 (B.E.T. surface area=343 $m^2$/g, DBP absorption=1.05 ml/g, primary particle diameter=16 nanometers); special carbon blacks available from Evonik Incorporated; and Channel carbon blacks available from Evonik-Degussa. Other known suitable carbon blacks not specifically disclosed herein may be selected as the filler or conductive component.

Examples of polyaniline fillers that can be selected for incorporation into the disclosed urea-glyoxal resins and polyester polyols layer are PANIPOL™ F, commercially available from Panipol Oy, Finland; and known lignosulfonic acid grafted polyanilines. These polyanilines usually have a relatively small particle size diameter of, for example, from about 0.5 to about 5 microns; from about 1.1 to about 2.3 microns, or from about 1.5 to about 1.9 microns.

Metal oxide fillers that can be selected for the disclosed urea-glyoxal resins and polyester polyols layer include, for example, tin oxide, antimony doped tin oxide, indium oxide, indium tin oxide, zinc oxide, and titanium oxide, and the like.

When present, the filler and fillers can be selected in an amount of, for example, from about 1 to about 70 weight percent, from about 3 to about 40 weight percent, from about 4 to about 30 weight percent, from about 10 to about 30 percent, from about 3 to about 30 weight percent, from about 8 to about 25 weight percent, or from about 13 to about 20 weight percent of the total solids based on the crosslinked mixture urea-glyoxal resins and polyester polyols, and the conductive component or filler.

Optional Plasticizers

Optional plasticizers, which can be considered plasticizers that primarily increase the plasticity or fluidity of a material, selected for the disclosed transfer assist members, include, diethyl phthalate, dioctyl phthalate, diallyl phthalate, polypropylene glycol dibenzoate, di-2-ethyl hexyl phthalate, diisononyl phthalate, di-2-propyl heptyl phthalate, diisodecyl phthalate, di-2-ethyl hexyl terephthalate and other known suitable plasticizers. The plasticizers can be utilized in various effective amounts, such as for example, from about 0.1 to about 30 weight percent, from about 1 to about 20 weight percent, and from about 3 to about 15 weight percent.

Optional Silicas

Optional silica examples, which can contribute to the wear resistant properties of the members and blades illustrated herein, include silica, fumed silicas, surface treated silicas, other known silicas, such as AEROSIL R972®, mixtures thereof, and the like. The silicas are selected in various effective amounts, such as for example, from about 0.1 to about 20 weight percent, from about 1 to about 15 weight percent, and from about 2 to about 10 weight percent.

Optional Fluoropolymer Particles

Optional fluoropolymers particles, which can contribute to the wear resistant properties of the members and blades illustrated herein, include tetrafluoroethylene polymers (PTFE), trifluorochloroethylene polymers, hexafluoropropylene polymers, vinyl fluoride polymers, vinylidene fluoride polymers, difluorodichloroethylene polymers or copolymers thereof. The fluoropolymer particles are selected in various effective amounts, such as for example, from about 0.1 to about 20 weight percent, from about 1 to about 15 weight percent, and from about 2 to about 10 weight percent.

Optional Leveling Agents

Optional leveling agent examples, which can contribute to the disclosed transfer assist members smoothness characteristics, such as enabling smooth coating surfaces with minimal or no blemishes or protrusions, of the members and blades illustrated herein include polysiloxane polymers or fluoropolymers. The optional polysiloxane polymers include, for example, a polyester modified polydimethylsiloxane with the trade name of BYK 310 (about 25 weight percent in xylene) and BYK® 370 (about 25 weight percent in xylene/alkylbenzenes/cyclohexanone/monophenylglycol=75/11/7/7); a polyether modified polydimethylsiloxane, with the trade name of BYK® 333, BYK® 330 (about 51 weight percent in methoxypropylacetate) and BYK® 344 (about 52.3 weight percent in xylene/isobutanol=80/20), BYK®-SILCLEAN 3710 and 3720 (about 25 weight percent in methoxypropanol); a polyacrylate modified polydimethylsiloxane, with the trade name of BYK®-SILCLEAN 3700 (about 25 weight percent in methoxypropylacetate); or a polyester polyether modified polydimethylsiloxane, with the trade name of BYK® 375 (about 25 weight percent in di-propylene glycol monomethyl ether), all commercially available from BYK Chemical. The leveling agents are selected in various effective amounts, such as for example, from about 0.01 to about 10 weight percent, from about 0.1 to about 6 weight percent, and from about 0.5 to about 4 weight percent.

Optional Acid Catalysts

Examples of optional acid catalysts selected are, for example, p-toluene sulfonic acid (p-TSA), dinonyl naphthalene disulfonic acid (DNNDSA), dinonyl naphthalene sulfonic acid (DNNSA), dodecylbenzenesulfonic acid (DDBSA), alkyl acid phosphate, phenyl acid phosphate, oxalic acid, maleic acid, carbolic acid, ascorbic acid, malonic acid, succinic acid, tartaric acid, citric acid, methane sulfonic acid, and the like, and mixtures thereof, and more specifically, p-toluene sulfonic acid.

Commercially available acid catalyst examples include p-toluene sulfonic acid (p-TSA) types and their blocked forms such as CYCAT® 4040, 4045, available from Allnex Belgium SA/NV, and K-CURE® 1040, 1040W, NACURE® XP-357, 2107, 2500, 2501, 2522, 2530, 2547, 2558, available from King Industries, Inc., Science Road, Conn.; dinonyl naphthalene disulfonic acid (DNNDSA) types and their blocked forms such as CYCAT® 500, available from Allnex Belgium SA/NV, and NACURE® 155, X49-110, 3525, 3327, 3483, available from King Industries, Inc., Science Road, Conn.; dinonyl naphthalene sulfonic acid (DNNSA) types and their blocked forms such as NACURE® 1051, 1323, 1419, 1557, 1953, available from King Industries, Inc., Science Road, Conn.; dodecylbenzenesulfonic acid (DDBSA) types and their blocked forms such as CYCAT® 600, available from Allnex Belgium SA/NV, and NACURE® 5076, 5225, 5414, 5528, 5925, available from King Industries, Inc., Science Road, Conn.; acid phosphate types and their blocked forms such as CYCAT® 296-9, available from Allnex Belgium SA/NV, and NACURE® 4054, XC-C207, 4167, XP-297, 4575, available from King Industries, Inc., Science Road, Conn.

The amount of acid catalyst is, for example, from about 0.01 to about 10 weight percent, from about 0.1 to about 8 weight percent, from about 1 to about 5 weight percent, or from about 1 to about 3 weight percent based on the solids present. The primary purposes of the catalysts are to assist in the crosslinking of the disclosed urea-glyoxal and polyester polyol mixtures.

Substrates

The mixtures of the urea-glyoxal resins and polyester polyols having incorporated therein the components as illustrated herein, such as fillers, are included on a supporting substrate, such as the substrate layer 17 of FIG. 4, examples of which are polyesters such as polyethylene terephthalate (PET), polybutylene terephthalate (PBT), and polyethylene naphthalate (PEN), polyamides, polyetherimides, polyamideimides, polyimides, polyphenyl sulfides, polyether ether ketones, polysulfones, polycarbonates, polyvinyl halides, polyolefins, mixtures thereof, and the like. Suitable substrate examples include MYLAR®, MELINEX®, TEIJIN®, TETORON®, and TEONEX®, considered to be bi-axially oriented polyester films, which are commercially available in a variety of finishes and thicknesses. These and other similar polymers are available from E.I. DuPont Company or SKC Incorporated. The substrate can be of a number of different thicknesses, such as from about 25 to about 250 microns, from about 50 to about 200 microns, or from about 75 to about 150 microns, and where the check film total thickness is, for example, from about 1 to about 10 mils, from about 1 to about 8 mils, from about 1 to about 5 mils, from about 2 to about 4 mils, and more specifically, about 3.8 mils, as determined by known means such as a Permascope.

Top Layer

The top or wear resistant bonded layer designated, for example, by the numeral 5pa, illustrated in FIG. 3, can be comprised of various suitable known and commercially available materials, such as polyolefins like ultra-high molecular weight polyethylenes (UHMW), a wear-resistant plastic with a low coefficient of friction, excellent impact strength, and possessing chemical and moisture resistance. UHMW comprises long chains of polyethylene of the formula illustrated below, which aligns in the same direction, and derives its strength largely from the length of each individual molecule (chain)

wherein n represents the number of repeating segments of at least about 100,000, and more specifically, from about 100,000 to about 300,000, and from about 150,000 to about 225,000.

The thickness of the disclosed top layer can vary depending, for example, on the thicknesses of the other layers that may be present and the components in each layer. Thus, for example, the thicknesses of the top wear resistant layer can vary of from about 1 to about 20 mils, from about 1 mil to about 15 mils, from about 2 to about 10 mils, or from about 1 mil to about 5 mils as determined by known means such as a Permascope.

Optional Adhesives

Optional adhesive layers designated, for example, as 6pa, 7pa, 8pa, and 9pa in FIG. 3 can be included between each of the transfer assist member layers, or partially included at the edges between each of the member layers. Adhesives may be used in the member assembly, and the thickness of each of the adhesive layers varies of, for example, from about 1 to about 50 millimeters, from about 10 to about 40 millimeters, or from about 15 to about 25 millimeters as determined by known means such as a Permascope.

The optional adhesive layers may also be included between each of the layers of the transfer assist members of FIG. 3, such as on the vertical sides between the substrate side of layer 1pa and layer 2pa, layers 2pa and 3pa, layers 3pa and 4pa, and on the horizontal sides between layer 4pa and the top wear layer 5pa. The horizontal sides of layers 1pa, 2pa, 3pa, and 4pa are usually not bonded together. A number of known adhesives can be selected for each adhesive layer, inclusive of suitable polyesters, a 3M™ Double Coated Tape 444, which is a 3.9 mils thick, 300 high tack acrylic adhesive with a 0.5 mil thick polyester carrier, white densified Kraft paper liner (55 lbs), mixtures thereof, and the like.

Specific embodiments will now be described in detail. These examples are intended to be illustrative, and not limited to the materials, conditions, or process parameters set forth in these embodiments. All parts are percentages by solid weight unless otherwise indicated.

EXAMPLE I

There was prepared a transfer assist blade check film as follows:

Preparation of the Partially Conductive Coating Dispersion

AROPLAZ®-6755-A6-80 (a polyester polyol from Reichhold), CYMEL® NF3041 (a butylated ethylene urea-glyoxal resin available from Allnex Belgium SA/NV), p-toluenesulfonic acid (a catalyst), and SILCLEAN® 3700 (a silicone leveling agent from BYK Chemie) were mixed together at the weight ratio of about 75/25/2/3 in methylene chloride (about 20 wt % solid) via agitation to obtain a polymeric base solution. EMPEROR® E1200 (a carbon black available from CABOT) was added to the above solution, and the solution was ball milled with 2 mm stainless steel shots at 200 rpm for 20 hours. The coating dispersion (AROPLAZ®-6755-A6-80/ CYMEL® NF3041/EMPEROR® E1200/p-toluenesulfonic acid/SILCLEAN® 3700=75/25/5/2/3 in methylene chloride, about 20 wt % solid) was filtered through a 20-micron Nylon cloth filter to obtain the final overcoat coating dispersion. The final dispersion was coated onto a 4 mil PET film via either a lab draw bar coater or a production extrusion coater. The coating was subsequently cured at 140° C./3 minutes to obtain a flat check film comprising a 15-micron crosslinked overcoat layer on 4.0-mil PET.

Preparation of the Petal Assembly (Blade Material Comprising Five Layers) of the Transfer Assist Member The above prepared disclosed check film (8 micron thick partially conductive crosslinked overcoat containing mixture of urea-glyoxal resins and polyester polyols layer on the 4 mils thick PET polymer layer), and three separate 5 mils thick MYLAR® PET films were cut into 4 millimeters by 38 millimeters strips, and the strips were aligned in the sequence of MYLAR® PET film, MYLAR® PET film, MYLAR® PET film, with the disclosed check film/PET substrate facing the MYLAR® PET film. Each adjacent pair of the aforementioned layers was bonded together using 3M™ Double Coated Tape 444 in between from the edges of the long sides to about 2.5 millimeters inside. The partially bonded layers were folded rendering the 2.5 millimeters wide bonded layers into a vertical position and the 1.5 millimeters wide unbounded layers into a horizontal position.

The UHMW polyethylene, obtained from E.I. DuPont, believed to be of the following formula/structure, wear resistant layer was then bonded to the horizontal section of the top MYLAR® PET film in a thickness of about 7 microns. The horizontal sections of the layers were then cut into about 40 smaller segments with unique shapes such as in rectangular shapes wherein n represents the number of repeating segments of from about 150,000 to about 225,000. The thickness of this layer was about 5 mils as determined by a Permascope.

Preparation of the Transfer Assist Member Assembly

The aluminum extruded component, such as component 1 of FIG. 1, was then attached to the above transfer assist member petal assembly, and then attached to the transfer assist member stainless steel clamp assembly, and the transfer assist member aluminum rivet illustrated herein.

Evaluation of the Check Film

The resistance of the crosslinked overcoat was measured at about 4.0E8 ohm using a Trek Model 152-1 Resistance Meter, and was very uniform across the entire 2.5 inch×17 inch (the dimension of the real blade petal assembly) sample strip.

An in-house tri-roller test showed that there was minimum wear on the overcoat layer after 800,000 wear/rub cycles, and there were no changes in the overcoat thickness and the resistance after the 800,000 wear/rub cycles. Furthermore, the adhesion force between the disclosed crosslinked overcoat layer and the PET substrate was over 85 g/cm noting adhesion force of 30 g/cm is sufficient for this type of application according to the field study.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. A transfer assist member comprising a plurality of layers, one of the layers being a check film layer comprising:
   a polymer support layer; and
   a crosslinked layer suitable for use in the transfer assist member comprising a crosslinked mixture of urea-glyoxal resins and polyester polyol resins disposed on the polymer support layer, wherein the polyester polyol resin has a hydroxyl functionality of from 2 to 6 and a hydroxyl number of from about 50 to about 400 mg KOH/g, wherein the urea-glyoxal resin is selected from the group consisting of a butylated ethyleneurea-glyoxal resin, an ethylated ethyleneurea-glyoxal resin, an ethylated 4,5-dihydroxyethyleneurea-glyoxal resin, and mixtures thereof.

2. The transfer assist member of claim 1, wherein the crosslinked mixture is accomplished by curing a mixture of the urea-glyoxal resins and the polyester polyol resins, and wherein a crosslinked value of the urea-glyoxal and polyol resins is from about 75 to about 100 percent.

3. The transfer assist member of claim 1, wherein the check film layer further includes a conductive component of carbon black.

4. The transfer assist member of claim 1, wherein the crosslinked mixture layer further includes carbon black, graphite, silica, polytetrafluoroethylene, a plasticizer, a catalyst, a polysiloxane copolymer, or mixtures thereof.

5. The transfer assist member of claim 4, wherein the crosslinked mixture has a resistance of from about $1\times10^7$ to about $9.99\times10^9$ ohm as measured by a Resistance Meter.

6. The transfer assist member of claim 1, wherein the polymer support layer is comprised of a polyester, a polyamide, a polyetherimide, a polyamideimide, a polyimide, a polyphenyl sulfide, a polyether ether ketone, a polysulfone, a polycarbonate, a polyvinyl halide, a polyolefin, or mixtures thereof.

7. The transfer assist member of claim 1, wherein the polymer support layer is comprised of a polyethylene terephthalate or a polyethylene naphthalate.

8. The transfer assist member of claim 1, wherein the crosslinked mixture further includes a conductive component selected from the group consisting of carbon black, graphite, metal oxide, polyaniline, polythiophene, polypyrrole, and mixtures thereof; silica; polytetrafluoroethylene; acid catalyst; and plasticizer, and the polymer support layer is comprised of a polyethylene terephthalate or a polyethylene naphthalate.

9. The transfer assist member of claim 8, wherein the plasticizer is selected from the group consisting of diethyl phthalate, dioctyl phthalate, diallyl phthalate, polypropylene glycol dibenzoate, di-2-ethyl hexyl phthalate, diisononyl phthalate, di-2-propyl heptyl phthalate, diisodecyl phthalate, and di-2-ethyl hexyl terephthalate, and mixtures thereof.

10. The transfer assist member of claim 1, wherein the plurality of layers is from 2 to 10 layers.

11. The transfer assist member of claim 1, wherein the plurality of layers is comprised of at least three separate polymer layers comprising a bottom polymer layer, a middle polymer layer, and a top polymer layer, wherein the bottom polymer layer is in contact with the polymer support layer of the check film layer, and wherein a single wear resistant layer is in contact with the top polymer layer.

12. The transfer assist member of claim 1 further including a wear resistant layer comprised of a polyethylene.

13. The transfer assist member of claim 12, wherein the wear resistant polyethylene layer is comprised of a high molecular weight polyethylene as represented by the following formula/structure wherein n represents the number of repeating segments of from about 100,000 to about 300,000, and wherein there is present an adhesive layer situated between each adjacent pair of the plurality of layers.

14. The transfer assist member of claim 1, wherein the polyester polyol is comprised of a condensation polymer derived from an alcohol and an acid, and the alcohol is one of ethylene glycol, diethylene glycol, triethylene glycol, butylene glycol, propylene glycol, dipropylene glycol, neopentyl glycol, 1,5-pentanediol, 1,8-octanediol, 1,2-propanediol, 1,3-butanediol, 1,2-pentanediol, 2-methyl-2,4-pentanediol, bisphenol A, Z, C, S, trimethylol propane, glycerin, pentaerythritol, and sugar alcohols, the acid is one of adipic acid, succinic acid, oxalic acid, malonic acid, glutaric acid, pimelic acid, suberic acid, azelaic acid, sebacic acid, undecanedioic acid, dodecanedioic acid, maleic acid, fumaric acid, glutaconic acid, traumatic acid, muconic acid, phthalic acid, isophthalic acid, terephthalic acid, and mixtures thereof.

15. A composite toner transfer assist blade comprising a plurality of bonded layers, one of the bonded layers being a bonded check film layer comprising:
a polymer layer substrate comprising a polyalkylene terephthalate, a polyester, or mixtures thereof; and
a crosslinked layer comprising a partially conductive crosslinked mixture of urea-glyoxal resins and polyester polyols layer disposed on the polymer layer substrate, wherein the polyester polyol resin has a hydroxyl functionality of from 2 to 6 and a hydroxyl number of from about 50 to about 400 mg KOH/g and wherein the top layer of the plurality of layers is a wear resistant layer and wherein the bonded check film includes conductive components, acid catalysts, silicas, plasticizers, fluoropolymer particles of tetrafluoroethylene polymers, trifluorochloroethylene polymers, hexafluoropropylene polymers, vinyl fluoride polymers, vinylidene fluoride polymers, difluorodichloroethylene polymers polysiloxane polymers, or mixtures thereof.

16. The composite toner transfer assist blade of claim 15, wherein the plurality of layers are comprised of three polyester layers situated between and in contact with the check film layer and the wear resistant layer.

17. The composite toner transfer assist blade of claim 15, wherein the wear resistant layer is comprised of an ultra-high molecular weight polyethylene as represented by the following formula/structure wherein n represents the number of repeating segments from about 125,000 to about 250,000, and wherein there are present adhesive layers situated between the wear resistant layer and the check film.

18. The composite toner transfer assist blade of claim 15, wherein the resin containing mixture is partially conductive with a resistance of from about $1 \times 10^7$ to about $9.99 \times 10^9$ ohm and is present in amount of from about 65 to about 100 weight percent based on the total solids, and further wherein the wear resistant layer is of a thickness of from about 1 to about 20 mils and the check film layer is of a thickness of from about 0.1 to about 50 microns.

19. A xerographic process for providing substantially uniform contact between a copy substrate and a toner developed image located on an imaging member, comprising:
moving a toner transfer flexible assist member from a non-operative position spaced from the imaging member to an operative position in contact with the copy substrate on the imaging member; and
applying pressure against the copy substrate in a direction toward the imaging member with the toner transfer flexible assist member, wherein the toner transfer flexible assist member comprises a plurality of layers, one of the layers being a check film layer further comprising:
a polymer support layer, and
a crosslinked layer suitable for use in the toner transfer flexible assist member comprising a crosslinked mixture of urea-glyoxal resins and polyester polyol resins disposed on the polymer support layer, wherein the polyester polyol resin has a hydroxyl functionality of from 2 to 6 and a hydroxyl number of from about 50 to about 400 mg KOH/g, wherein the urea-glyoxal resin is selected from the group consisting of a butylated ethyleneurea-glyoxal resin, an ethylated ethyleneurea-glyoxal resin, an ethylated 4,5-dihydroxyethyleneurea-glyoxal resin, and mixtures thereof.

* * * * *